United States Patent [19]

Diard

[11] Patent Number: 5,033,423
[45] Date of Patent: Jul. 23, 1991

[54] INTERNAL COMBUSTION ENGINE

[75] Inventor: Jean-Claude Diard, Bessaucourt, France

[73] Assignee: Caoutchouc Manufacture et Plastiques S.A., Versailles, France

[21] Appl. No.: 446,195

[22] Filed: Dec. 5, 1989

[30] Foreign Application Priority Data

Dec. 5, 1988 [FR] France .................. 88 16037

[51] Int. Cl.⁵ ............................. F16H 7/12
[52] U.S. Cl. .................. 123/90.31; 474/133; 474/135
[58] Field of Search ............ 123/90.31; 474/133, 474/135, 111, 117

[56] References Cited

U.S. PATENT DOCUMENTS

| 3,071,980 | 1/1963 | Brewer | 474/133 |
|---|---|---|---|
| 4,144,772 | 3/1979 | Brackin et al. | 74/242.15 R |
| 4,464,146 | 8/1984 | Arthur | 474/133 |
| 4,472,162 | 9/1984 | Hitchcock | 474/135 |
| 4,504,254 | 3/1985 | Foster | 474/135 |
| 4,563,167 | 1/1986 | Foster | 474/133 |
| 4,596,538 | 6/1986 | Henderson | 474/135 |
| 4,624,652 | 11/1986 | Foster | 474/133 |
| 4,685,429 | 8/1987 | Oyaizu | 123/90.31 |
| 4,698,049 | 10/1987 | Bytzek et al. | 474/135 |
| 4,702,727 | 10/1987 | Dahm | 474/101 |
| 4,784,631 | 11/1988 | Henderson | 474/135 |
| 4,816,011 | 3/1989 | Kotzab | 474/135 |

FOREIGN PATENT DOCUMENTS

| 0114779 | 1/1984 | European Pat. Off. . |
|---|---|---|
| 0157193 | 3/1985 | European Pat. Off. . |
| 3528442 | 8/1985 | Fed. Rep. of Germany . |
| 0318686 | 2/1957 | France . |
| 2509408 | 7/1982 | France . |
| 8813147 | 10/1988 | France . |
| 2070727 | 2/1980 | United Kingdom . |

Primary Examiner—Charles J. Myhre
Assistant Examiner—Weilun Lo
Attorney, Agent, or Firm—Nils H. Ljungman & Associates

[57] ABSTRACT

An internal combustion engine including a belt tension adjusting device and a belt tensioner damping arrangement.

18 Claims, 4 Drawing Sheets

FIG_1
PRIOR ART

INTERNAL COMBUSTION ENGINE

BACKGROUND OF THE INVENTION

1. Field of the Invention:

This invention relates to internal combustion engines which employ flexible link transmissions, such as belts. The belts rely on mechanical adherence, or friction, to drive a pulley. Such a belt operates driven devices which receive mechanical power, from the belt. These belts are driven by an internal combustion engine. The belts are used, more specifically, to drive accessories on automobile engines. The belts must be placed under a specific amount of tension for proper operation. Such tension may be applied by a roller, positioned at the end of a movable lever arm.

The lever arm receives an elastic torque, which may be provided by a biasing means in the form of a flat elastomer which is positioned, or sandwiched, between rigid armatures. The elastomer may be adherized, during vulcanization, to the armatures. In use, the elastomer is subjected to shear stress, after initially being subjected to a uniform axial prestress. The axial prestress is transmitted through the friction surface material of the armatures thus damping the elastic tension variations of the belt, by counteracting the variations of shear stress.

2. Description of the Prior Art:

Flexible link transmissions, which rely on frictional, or other mechanical, interaction with a pulley, are, generally, called engine belts. Such belts are essential to the operation of internal combustion engines and are used in automobiles and on stationary engines to drive various accessories, such as alternators, water pumps, air conditioners, power steering pumps, etc.

The accessories can be positively driven by a lubricated articulated chain, as well as by synchronous toothed flexible belts. When utilizing either of such links, as well as when utilizing mechanical adherence belts, the adjustment for wear and for thermal expansions and contractions of the links is performed by a device called a tensioner. The tensioner, generally, operates by means of a cam or by displacement of one of the pulleys of the tensioner. Nevertheless, because of dynamic pulsations applied to the belt during operation, and the longitudinal rigidity of the belt in synchronous drives, the center distances, between pulleys over which the belt runs, should be fixed after adjustment. However, this, possibly, could be at the expense of seeking a desired compensation of expansions and contractions of the engine, as explained in French Patent Application No. 88 13147.

Mechanical adherence transmissions require a permanent tension. In the past, such tension has, generally, been provided by the elasticity of flexible armatures. This is particularly the case in technology employing trapezoidal cross-section or vee belts. With those belts, as well as with those belts described above, but for different reasons, the tensioning device is blocked in a fixed position after preliminary adjustments have been made.

In the most recent generation of flexible links, called multirib belts, the frictional adherence of the belts to parts of the engine is achieved by the employment of a number of inclined faces on the conical sides of the pulleys over which the belts travel.

Flexibility of the armature is acceptable with belt materials having great longitudinal rigidity or rather being inelastic along the length thereof, such as polyester, glass fiber and aramid.

The manufacturers of internal combustion engines have sought a tensioning device with remains elastic in operation and, generally, includes a sheave pulley, supported by an elastic tension lever arm, hereinafter designated a "tensioning roller."

Various tensioning rollers use elastomers to provide elastic tension. Examples of such tension rollers are disclosed in U.S. Pat. No. 4,144,772, which is assigned to The Toro Company, and which discloses a torsion ring embedded in a square block to provide both tension and damping. Great Britain Patent No. 2,070,727, which is assigned to Alan Crosley Pritchard, describes a similar technique, applied to a rocking plate, while European Patent No. 01 57 193, which is assigned to RIV-SKF, applies the technique to a tensioning cam.

U.S. Pat. No. 4,702,727, which is assigned to Daimler-Benz, U.S. Pat. No. 4,472,162, which is assigned to Dyneer Corporation and French Patent No. 25 09408, which is assigned to Litens Automotive, all disclose the utilization of an elastomer for damping purposes through the employment of friction, while an elastic, or biasing, force is exerted by a metal spring. This configuration makes possible the establishment of a tension which provides relatively little variation due to dynamic equilbrium displacements. The reliability, or stability, of the tensions required by the automobile industry may not always be achieved with the damping action provided by elastomer friction, since the tensions provided thereby can vary due to the appearance of fine powder caused by wear or, on the other hand, a softening of surfaces, or creep, because of excessive alternating movements.

For this reason, a ring attached to concentric armatures has been used in the device disclosed in U.S. Pat. No. 3,975,965, which is assigned to Dayco Corporation, and in European Patent No. 01 14 779. The rotation of the interior ring provides regulation of the tension, although the patents differ in the means used to re-establish the tension during maintenance.

The technique of applying radial prestress to an interior ring, for example by hammering on an exterior ring which covers the interior ring, by expanding the interior ring, or by employing both techniques when the interior ring has an intermediate armature, provides rigidity to the interior ring and reduces deformation, since the ring takes on a somewhat conical configuration when twisted. This design also allows additional stress to be applied to an elastomer between the armatures. Such stress, however, is limited by the geometry of the elastic ring, which is used to exert significant tension forces, since the ring occupies a great deal of longitudinal space over the axis of rotation of the lever supporting the tensioning roller. Such a space requirement would require the device to be too thick to be practical.

To avoid rapid variations of tension when variations of the perimeter of the flexible link occur due to wear or creep, good flexibility is necessary. However, such flexibility requires that additional thickness be given to the elastomer ring. That, in turn, increases the volume occupied and the weight of the tensioning device, while the damping is limited by the visco-elastic characteristics of the elastomer material, even if a prestress is applied as mentioned above.

An additional disadvantage of the prior art is that the reduction of the conical deformation occasionally requires the addition of several roller bearings to counteract the deformations of the elastic rings.

OBJECT OF THE INVENTION

One object of the present invention is to improve performance of belt tensioners by employing an elastic shear torque element which is constructed of a flat elastomer sandwiched between and adherized during vulcanization to rigid, circular armatures.

SUMMARY OF THE INVENTION

With the present invention, the thickness of the belt tensioner is not excessive because the thickness of the elastic element can remain small, while still contributing the required flexibility, if necessary, by employing flat, intermediate armatures such as washer shaped discs.

The employment of one or two intermediate armatures may also be technologically advantageous. Since alternating fatigue working conditions may be significantly improved by permanently prestressing the elastic element in the direction perpendicular to the axis of the element, the separation of the elastic element into at least two layers by at least one intermediate armature confers a rigidity in the axial direction of the elastic element which is usually significantly higher than in the other directions.

A uniform supplementary translation shear in the plane of the sandwich configured elastic element and armatures would typically produce a significant eccentricity between the armatures, when under the influence of reaction torque, since the rigidity under these circumstances is not usually very high.

Although equilibrium is not necessarily undesirable, it is, nevertheless, more advantageous to have the two armatures, which are on opposite sides of the elastic element, pivot relative to each other, by means of a bearing, lined with an antifriction ring which resists the elastic variations of the tension. Therefore, by employing such a bearing, a damping of elastic variations, which is proportional to the tension, is provided.

This characteristic of providing damping which is proportional to the tension is governed by the same laws as visco-elastic damping, but the value, or level, of damping is usually much lower. The absolute value of the damping may preferably be increased as much as desired because of the existence of the uniform axial precompression force or prestress.

A pressure, on the order of ten to twenty bars for example, is possible from the form factor of the structure, or characteristics provided by the flat circular sandwich configured of the elastic element and the armatures. This pressure, multiplied by the coefficient of friction of a flat ring or cylinder constructed of antifriction material, makes it possible to exert a damping of torque which reaches the same order of magnitude as the permanent pure shear prestress exerted on the armatures by the elastomer element. The combination of these forces and the force caused by the friction on the cylindrical centering bearing makes possible a damping of the variations or pulsations in the elastic tension of the belt associated therewith. It is, therefore, usually much easier to approach the critical visco-elastic damping values typically required for damping.

The surface frictions between the elastomer and the metal of the support described in the prior art do not usually provide satisfactory stability. The present invention in contrast typically provides satisfactory stability and in an embodiment thereof comprises a tensioning roller for a transmission which transmission employs a flexible link which typically relies on mechanical adherence, and is supported by a tensioning lever which lever rotates about an antifriction ring on a bearing.

An embodiment of the present invention is characterized by the fact that the elastic torque is obtained by torsion shear of a flat elastomer body sandwiched between and adherized during vulcanisation to rigid, preferably, circular armatures and which elastomer body is typically subjected to an axial prestress. Also, the present invention has an embodiment which is characterized by the fact that the damping of the tension variations is, primarily, achieved by the relative friction of the flat surfaces which surfaces are, also, subjected to the axial prestress provided by the elastomeric body.

The present invention provides an internal combustion engine having a mechanical power generation device for generating mechanical power, a first wheel for being connected to and receiving mechanical power from the mechanical power generation device, a second wheel positioned in spaced-apart relation from the first wheel, with the second wheel being connected to and for receiving at least a portion of the mechanical power from the first wheel. Also provided is a belt having a surface, and connected between the first wheel and the second wheel for transferring mechanical power from the first wheel to the second wheel, and a belt tension adjusting device for being in contact with the surface of the belt for adjusting the tension of the belt by applying a controlled amount of force to the surface of the belt. The belt tension adjusting device is provided for being movably supported by bracket apparatus and comprises a movable member having a surface for being in contact with the belt. Movement of the movablr member relative to the bracket apparatus alters the tension on the belt. Further provided is a belt tensioner damping device, for being mechanically connected to the belt tension adjusting device, comprising resilient member apparatus having an at least partially solid interior. The belt tensioning damping device defines an axis and is positioned in compression between the bracket apparatus and the movable member device for applying an axial force along the axis to the bracket apparatus and the movable member. The resilient member is provided for receiving a torsional force from between and applying a torsional counterforce between the bracket apparatus and the movable member when the movable member is moved relative to the bracket apparatus. A friction control device is, also, provided and has a surface for being placed in direct contact with the surface of the movable member. The surface of the friction control device and the surface of the movable member have a mutual coefficient of friction which provides a preselected level of frictional force between the friction control device and the movable member when the movable member is moved relative to the bracket apparatus and a preselected force is applied between the friction control device and the movable member. The axial force from the resilient member applies the preselected force between the friction control device and the movable member, and the preselected frictional force substantially damps tension variations in the belt.

BRIEF DESCRIPTION OF THE DRAWINGS

The present invention may be better understood when taken in conjunction with the appended drawings in which.

DESCRIPTION OF THE PREFERRED EMBODIMENT

FIGS. 1-4 show preferred embodiments of the claimed invention. Internal combustion engine 30 is designed to operate a plurality of accessories, such as alternator 10, a water pump, etc., in addition to typically propelling an automobile or the like or providing power for stationary purposes. Support plate 1 may be made of bent or stamped steel sheet and fastened to, for example, alternator 10 by several holes or adjustment studholes.

Lever 2, usually also made of stamped sheet metal, is articulated and adjacent to a flat sandwich shaped member 31. Member 31 includes elastomer element 3 and armatures 13a and 13b. Lever 2 supports the bearing of sheave pulley 4. Sheave pulley 4 applies tension to flexible link, or belt, 5 and, at the same time, increases the winding angle of flexible link 5 on the driven pulley, that is, the angle about which the flexible link 5 is wrapped around the driven pulley to drive the at least one rotating accessory, such as the alternator 10.

The orientation angle A of lever 2, in relation to a fixed axis, allows an elastic recall torque to be provided to rotate lever 2 along arc B, at equilibrium.

An advantageous arrangement for assembly-line installation of the accessory operated by flexible link 5, such as alternator 10, may be provided by creating a controlled amount of desired elastic deformation to link 5 by applying a desired tension to link 5. The elastic tension and deformation to link 5 may be done in the manufacturer's plant. The tension roller is then locked by, for example, bolt 6 so that the tension roller stays in a fixed position. This prevents pivoting of the tensioning roller.

The adjustment of lever 2 during installation of accessories, therefore, includes positioning lever 2 to achieve the desired value of angle A, without changing or considering the generally elastically neutral position defined by angle B. The portion of angle B is usually determined by the manufacturer in accordance with the configuration of the belt riding over the various accessories.

Figure 3:
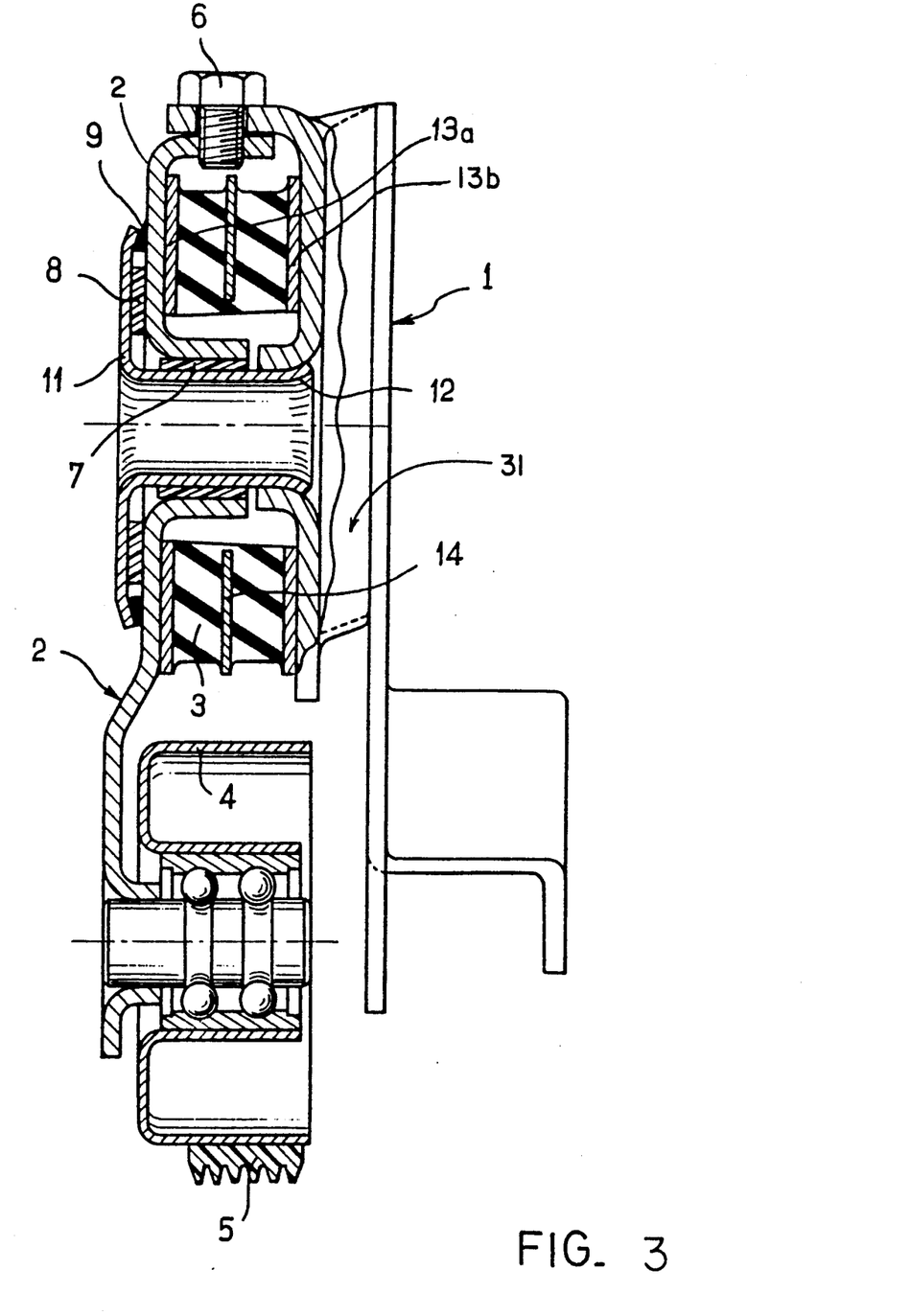
FIG. 3 is a sectional view of FIG. 2 taken along line CC'.

Support plate 1 is shown in partial section in FIG. 3. Prestress ring 11, which may act as a swivel bearing, is fixed in position by extremity 12 of its tubular axis. A reverse arrangement (not shown) could also be provided, in which support plate 1 would support a pivoting shaft or axis, on which prestress ring 11 would be clamped.

In either variant, the shaft, or axis, typically supports cylindrical antifriction ring 7, which is preferably made of a material having a low coefficient of friction such as vinyl polytetrafluoride. Lever 2 generally swivels on antifriction ring 7 without significant clearance between the ring 11 and lever 2. Ring 11 may be supported by an embossing on the sheet metal of support plate 1.

Lever 2, like support plate 1, generally has a flat revolving part which is in contact with flat sandwich shaped member 31. Elastomer element 3 exerts an axial precompression force through armatures 13a and 13b against levers 1 and 2. Elastomer element 3 possesses some flexibility so that armature 13a can, somewhat, rotate relative to armature 13b through the twisting deformation of elastomer element 3.

Relative friction between armature 13a and lever 2, and armature 13b and support plate 1, must be provided so that the level of friction is an improvement over simple friction. This may be accomplished by providing a coincidence of holes in or other structures on the armatures 13a and 13b and convex or concave portions in the facing surfaces. Alternatively, grooving, embossed portions or even a simple and appropriate milling or knurling can be provided to improve or increase the level of friction between the armatures 13a and 13b and the facing surfaces.

Figure 1:
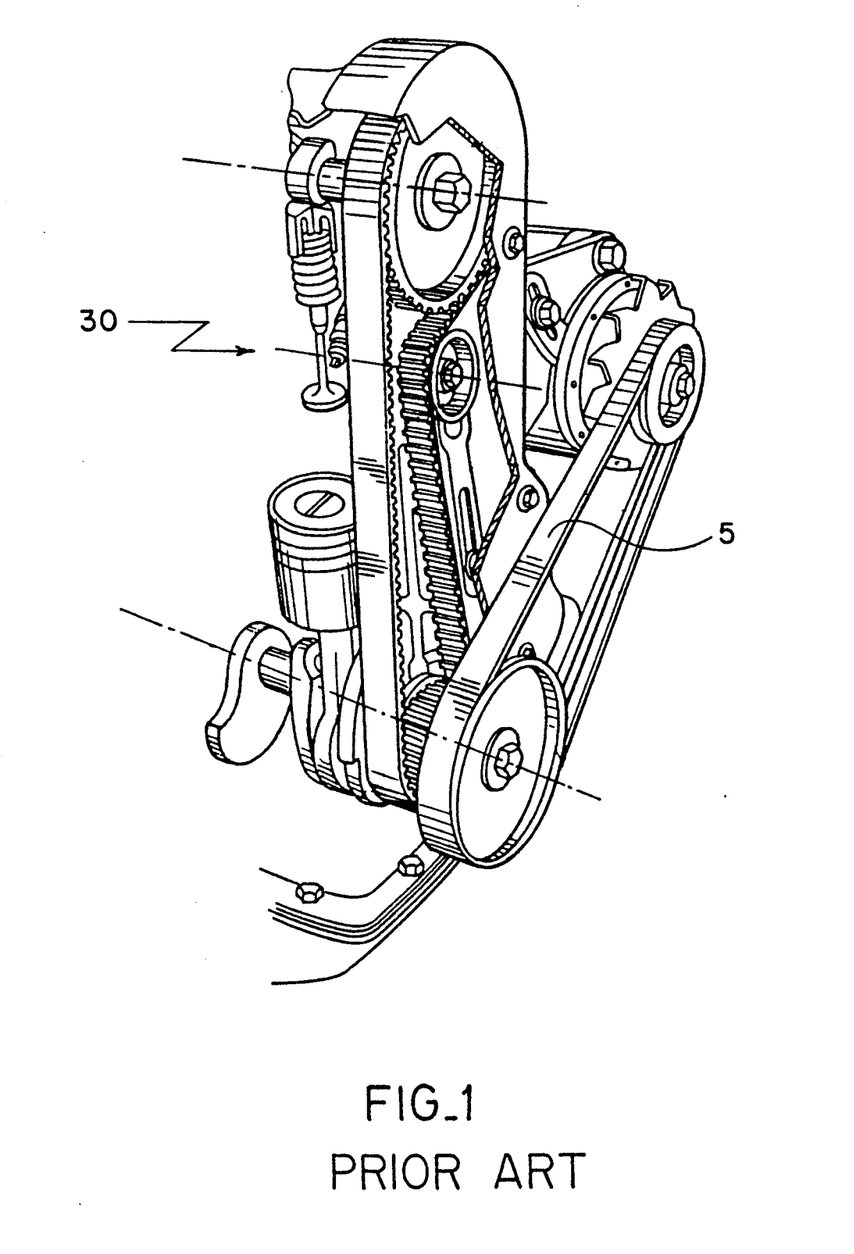
FIG. 1 is a perspective view, partially in section of a portion of an internal combustion engine.
Figure 2:
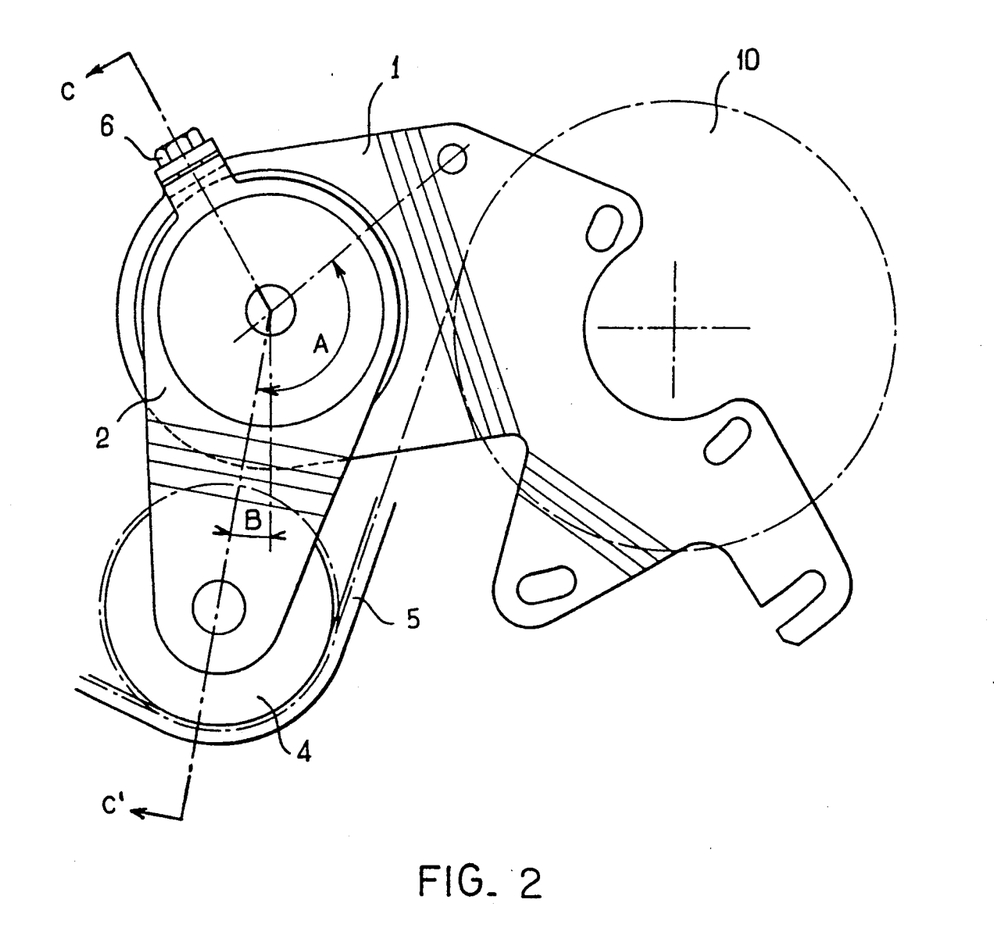
FIG. 2 is a side elevational view, partially in section, of a belt tensioning apparatus employing the present invention.

The neutral elastic recall position, defined by angle B in FIG. 2, often requires a certain precision of placement. To achieve such precision of placement, an angular arrangement of convex and concave portions can be provided in a vast multitude thereof in order to provide a great number of different relative positions between the components having the convex and concave portions. The position will, therefore, be achieved by rotation of flat sandwich shaped member 31.

Another solution for achieving the desired position consists of locally deforming armatures 13a and 13b, or the sheet metal from which components 1 and 2 are formed after assembly, by a plier crimp on their edges. To do this, armatures 13a and 13b need not to be of circular section but may have a notch. The axial rigidity of elastomeric element 3 can often advantageously be increased by the interposition of one or more intermediate reinforcement armatures 14. Armatures 14 generally are made of sheet steel like armatures 13a and 13b and positioned as shown preferably in a central portion of the elastomeric element 3.

Figure 4:
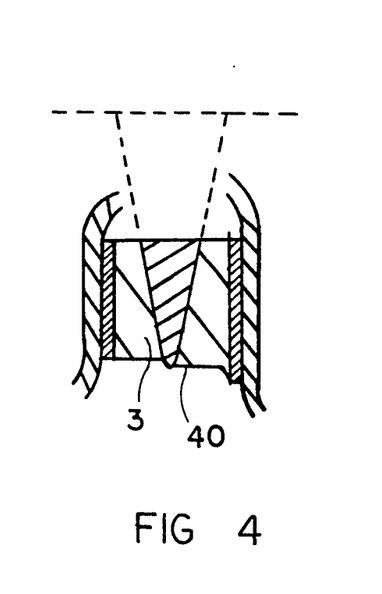
FIG. 4 is a sectional side elevational view of a resilient member employing a biconical armature.

Each such intermediate reinforcement armature 14 is, preferably, flat. To exert more uniform shear stresses, the intermediate reinforcement armature can be machined slightly biconically so that the thickness of the elastomer, on both sides of the armature 40, increases, theoretically, in proportion to the radius defined when generally moving from the center of the cylinder hole in the central region of the elastomeric element 3 in a direction which is radially outward, as shown in FIG. 4.

The axial prestress exerted, at the time of assembly, by prestress ring 11 is through a flat, antifriction washer 8 which is preferably made of a material having a low coefficient of friction, such as vinyl polytetrafluoride. The ring is then clamped at extremity 12 thus maintaining the prestress on the structure.

An elastomer gasket 9, preferably having a toroidal or flat cross section, advantageously protects antifriction washer 8 from contamination by dust, or other undesired contaminants from the environment, preferably, without having a significant effect on the elastic recall torque of member 31.

The axial rigidity, provided by the reinforcement of member 31 by means of one or more intermediate or reinforcement armatures, makes it possible to exert pressures exceeding, for example, 12 to 25 bars on antifriction washer 8.

Vinyl polytetrafluoride, cited as an example of an antifriction material, is known to exhibit, under these conditions, a coefficient of starting friction which is only slightly higher than the coefficient of sliding friction. For example, the friction may typically be equal to 0.10 or 0.11, and is, generally, always less than 0.15.

The tangential stress which this friction may present in opposition to the elastic recall torque of the tensioning roller is, therefore, generally on the order of a magnitude of 2 to 2.5 deca Newtons per square centimeter, which is typically rather close to that which the shear of the elastomer can exert at the periphery of elastomeric element 3.

By appropriately selecting the average radii of action of member 31, and of antifriction washer 8 which generally has a smaller outside diameter, the designer can adjust the friction to result in a level of damping of tensioning torque to a desired value. The desired level of damping may be the critical value, for example for non-oscillatory response or a lesser value of damping for oscillatory damping. Parasitic vibrations and stresses often cause controlled frictional sliding, between lever 2 an antifriction washer 8, to begin. Consequently, a lack of tension on the flexible link usually cannot occur as the result of an improper sticking of the assembly.

The rocking rigidity of lever 2 is preferably provided by the rigidity of the prestress setting of lever 2 upon antifriction washer 8, which, in turn, provides the necessary force for the controlled frictional contact against the prestressed ring 11. The rocking rigidity, therefore, is not usually provided through the use of the cylindrical antifriction ring 7. The clearance of cylindrical antifriction ring 7 has little effect on the operation of the present invention, because the rigidity of the metal parts through antifriction washer 8 preferably opposes any parasitic force on the roller, perpendicular to the plane of the transmission.

When the manufacturer has measured the elastic recall torque and determined the position of angle B, which is assumed during the operation of engine 30 and which is in relation to the rest position of lever 2, blocking bolt 6 may then be inserted to prevent any rotation of lever 2 until the apparatus is installed on the engine.

Support plate 1 has a studhole and lever 2 has a threaded hole for receiving bolt 6 to, thereby, secure support plate 1 and lever 2 together. Bolt 6 can also be tightened during maintenance to preserve the recommended tension, before disassembly of the structure of the invention from the engine. Bolt 6 must be removed during or subsequent to installation of the belt tensioner on the engine, to prevent any blockage of movement of the assembly, such as, by the action of vibrations which may cause the threading or rather rethreading of the bolt or screw 6 into the threaded hole of the lever 2.

This belt tension adjusting arrangement of the present invention is also generally beneficial to the operation of a belt transmission system in case of variations of tension in the belt caused by temperature variations. If all the center distances between pulleys expand significantly when the engine housing heats up, the rise in temperature typically causes a decrease of the modulus of the elastomer and, consequently, of the torque provided by the elastomer. This effect reduces the risk of exaggerated increase of tension on the belt at high temperature. On the other hand, the tension usually has a tendency to increase with the modulus at very low temperature, which prevents or reduces the loss of tension which is common in the absence of a tensioning device.

In summary, this invention presents a safe, secure and economical device when the designer of an engine requires a permanent elastic tension on a flexible link transmission, such as a multi-rib belt. The automated installation of an assembly pre-adjusted to the recommended values is available, without preventing the opportunity for disassembly for maintenance without losing initial adjustment of the assembly. The integration of the elastic tensioning function with the damping function provides an assembly which is generally compact, very rigid and which resists or reduces the vibrations to which the belt is exposed on an engine.

A technician skilled in the art can, of course, make various modifications to the tensioning roller for the flexible link transmission and to its variants, without going beyond the context of the invention.

U.S. Pat. No. 4,326,848, entitled "Constant Belt Tension Device" and U.S. Pat. No. 4,036,029, entitled "Air Conditioning Unit For Automobiles", disclose internal combustion engine devices.

One feature of the invention resides broadly in a tensioning roller for flexible link transmission 5, operating by mechanical adherence, supported by a tensioning lever 2, rotating by means of an antifriction ring 7 on a bearing, characterized by the fact that the elastic torque is obtained by torsion shear of a flat elastic sandwich 3 made of elastomer and adherized to rigid armatures 13a and 13b subjected to an axial prestress, and that the damping of the tension variations is principally obtained by the relative friction of the flat surfaces which are also subjected to the same axial prestress.

Another feature of the invention resides broadly in a tensioning roller characterized by the fact that the axial prestress of the flat elastic sandwich 3 is exerted between the support plate 1 and the lever 2 by means of a flat antifriction washer 8. the rotation of which around the pivoting axis opposes the variations of tension by damping variations of the elastic torque, between the armatures 13 of said flat elastic sandwich 3.

Still another feature of the invention resides broadly in a tensioning roller characterized by the fact that the axial rigidity of the flat elastic sandwich 3 between its armatures 13 is increased by the addition of at least one intermediate reinforcement armature 14, this arrangement making it possible to exert axial compression stresses at least ten times higher than the elastic torsion stresses which are perpendicular to them.

Still yet another feature of the invention resides broadly in a tensioning roller characterized by the fact that each intermediate reinforcement armature 14 is flat.

Yet another feature of the invention resides broadly in a tensioning roller characterized by the fact that each intermediate reinforcement armature 14 is biconical.

Still yet another feature of the invention resides broadly in a tensioning roller characterized by the fact that the material constituting the flat antifriction washer 8 has a coefficient of friction at the surface facing the lever 2 of at least 0.15.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The invention as described hereinabove in the context of a preferred embodiment is not to be taken as limited to all of the provided details thereof, since modifications and variations thereof may be made without departing from the spirit and scope of the invention.

What is claimed is:

1. Internal combustion engine comprising:
   mechanical power generation means for generating mechanical power;
   first wheel device being connected to and receiving mechanical power from said mechanical power generation means;
   second wheel device positioned in spaced-apart relation to said first wheel device, said second wheel device being connected to and receiving at least a portion of said mechanical power from said first wheel device;
   belt means having a surface, said belt means being connected between said first wheel device and said second wheel device for transferring mechanical power from said first wheel device to said second wheel device;
   belt tension adjusting means being in contact with said surface of said belt means for adjusting the tension of said belt means by applying a controlled amount of force to said surface of said belt means, said belt tension adjusting means being movably supported by bracket means, said belt tension adjusting means comprising movable member means being in contact with said belt means, said movable member means comprising a surface, said movement of said movable member means relative to said bracket means altering the tension of said belt means; and
   belt tensioner damping device being mechanically connected to said belt tension adjusting means, said belt tension damping device comprising:
   resilient member means having an at least partially solid interior and defining an axis and positioned in compression between said bracket means and said movable member means applying an axial force along said axis to said bracket means and said movable member means, said resilient member receiving a torsional force and applying a torsional counter-force between said bracket means and said movable member means when said movable member means is moved relative to said bracket means; and
   friction means having a surface, said surface of said friction means being placed in direct contact with said surface of said movable member means, said surface of said friction means and said surface of said movable member means having a mutual coefficient of friction which provides a preselected level of frictional force between said friction means and said movable member means when said movable member means is moved relative to said bracket means and when a preselected force is applied between said friction means and said movable member means;
   said resilient member means being configured for generating said axial force and applying said preselected force between said friction means and said movable member means thereby substantially damping tension variations in said belt means; and
   said internal combustion engine further including intermediate armature means positioned at least partially within said interior of said resilient member means for increasing said axial force applied by said resilient member means along said axis.

2. The internal engine of claim 1, wherein said resilient member means comprises torsion shear means for developing said torsional counterforce.

3. The internal combustion engine of claim 2, wherein said axial force exerts axial stresses greater than those due to said torsional counterforce through said intermediate armature means.

4. The internal combustion engine of claim 3, wherein said axial stresses are about at least ten times greater than stresses due to torsional counterforce.

5. The internal combustion engine of claim 3, wherein said intermediate armature means is disc shaped and includes two generally flat surfaces.

6. The internal combustion engine of claim 3, wherein said intermediate armature means is biconically shaped.

7. The internal combustion engine of claim 3, wherein said coefficient of friction between said surface of said friction control means and said surface of said movable member means is at least 0.15.

8. The internal combustion engine of claim 1 wherein:
   said resilient member means comprises torsion shear means for developing said torsional counterforce;
   an intermediate armature means is positioned at least partially within said interior of said resilient member means for increasing said axial stresses applied by said resilient member means along said axis;
   said axial stresses are about at least ten times greater than those due to said torsional counter-force;
   said intermediate armature means is disc shaped and includes two generally flat surfaces; and
   said coefficient of friction between said surface of said friction means and said surface of said movable member means is at least 0.15.

9. The internal combustion engine of claim 1 wherein:
   said resilient member means comprises torsion shear means for developing said torsional counterforce;
   an intermediate armature means is positioned at least partially within said interior of said resilient member means for increasing said axial stresses applied by said resilient member means along said axis;
   said axial stresses are about at least ten times greater than those due to said torsional counter force;
   said intermediate armature means is biconically shaped; and
   said coefficient of friction of said surface of said friction control means and said surface of said movable member means is at least 0.15.

10. Belt tension adjusting means for being in contact with a surface of a belt for adjusting the tension of the belt by applying a controlled amount of force to a first surface of the belt, said belt tension adjusting means for being movably supported by bracket means, said belt tension adjusting means comprising:
    a movable member means for being in contact with the belt, said movable member means comprising a second surface, said movement of said movable member means relative to said bracket means altering the tension of said belt means; and
    belt tensioner damping device for being mechanically connected to said belt tension adjusting means, said belt tensioner damping device comprising:
    resilient member means having an at least partially solid interior and defining an axis and positioned in compression between the bracket means and said movable member means for applying an axial force along said axis to the bracket means and said movable member means, said resilient member for receiving a torsional force and applying a torsional counter force between the bracket means and said movable member means when said movable member means is moved relative to the bracket means; and friction means having a third surface, said third surface of said friction means for being placed in direct contact with said second surface of said movable member means, said third surface of said friction means and said second surface of said movable member means having a mutual coefficient of friction which provides a preselected level of frictional force between said friction means and said movable member means when said movable member means is moved relative to the bracket means and when a preselected force is applied between said friction means and said movable member means;

said resilient member means generating said axial force to apply said preselected force between said friction means and said movable member means thereby substantially damping tension variations in the belt; and said resilient member means further including intermediate armature means positioned at least partially within said interior of said resilient member for increasing said axial force applied by said resilient member means along said axis.

11. The apparatus of claim 10, wherein said torsional member means comprises torsion shear means for developing said torsional counterforce.

12. The apparatus of claim 11, wherein said axial force exerts axial stresses greater than said those due to torsional counterforce through said intermediate armature means.

13. The apparatus of claim 12, wherein said axial stresses are about at least ten times greater than stresses due to torsional counterforce.

14. The apparatus of claim 12, wherein said intermediate armature means is disc shaped and includes two generally flat surfaces.

15. The apparatus of claim 12, wherein said intermediate armature means is biconically shaped.

16. The apparatus of claim 12, wherein said coefficient of friction between said surface of said friction means and said surface of said movable member is at least 0.15.

17. The apparatus of claim 10 wherein:

said resilient member means is made of an elastomer and adherized during vulcanization to exterior armature means;

said exterior armature means and said resilient member means comprise flat elastic sandwich means;

said exterior armature means applies an axial prestress to said resilient member means;

said friction means is washer means;

said washer means includes surface means;

said surface means of said washer means is positioned adjacent to said movable means;

said surface of said washer means is positioned adjacent to said moveable member means;

said resilient member means comprises torsion shear means for developing said torsional counterforce;

an intermediate armature means is positioned at least partially within said interior of said resilient member means for increasing said axial stresses applied by said resilient member means along said axis;

said axial stresses are about at least ten times greater than those due to said torsional counter force;

said intermediate armature means is disc shaped and includes two generally flat surfaces; and said coefficient of friction between said surface of said friction means and said surface of said movable member is at least 0.15.

18. The apparatus of claim 10 wherein:

said resilient member means comprises torsion shear means for developing said torsional counterforce;

said resilient member means is made of an elastomer and adherized during vulcanization to exterior armature means;

said exterior armature means and said resilient member means comprise flat elastic sandwich means;

said exterior armature means applies an axial prestress to said resilient member means;

said friction means is washer means;

said washer means includes surface means;

said surface of said washer means is positioned adjacent to said movable means;

an intermediate armature means is positioned at least partially within said interior of said resilient member means for increasing said axial stresses applied by said resilient member means along said axis;

said axial stresses are about at least ten times greater than those due to said torsional counter force;

said intermediate armature means is biconically shaped; and said coefficient of friction of said surface of said friction means and said surface of said movable member is at least 0.15.

* * * * *

UNITED STATES PATENT AND TRADEMARK OFFICE
CERTIFICATE OF CORRECTION

PATENT NO. : 5,033,423

DATED : July 23, 1991

INVENTOR(S) : Jean-Claude DIARD

It is certified that error appears in the above-identified patent and that said Letters Patent is hereby corrected as shown below:

In column 4, line 39, after the second instance of "the", delete "movablr" and insert --movable--.

In column 8, line 2, delete "temperature," and insert --temperatures,--.

In Claim 16, line 3, after "member", insert --means--.

In Claim 17, line 27, after "member", insert --means--.

In Claim 18, line 14, after "movable", insert --member--.

In Claim 18, lines 24-25, after "member", insert --means--.

Signed and Sealed this

Sixteenth Day of March, 1993

*Attest:*

STEPHEN G. KUNIN

*Attesting Officer*     *Acting Commissioner of Patents and Trademarks*